(12) United States Patent
Tojo et al.

(10) Patent No.: US 10,518,441 B2
(45) Date of Patent: Dec. 31, 2019

(54) EXTRUDER PROVIDED WITH VENTS

(71) Applicant: THE JAPAN STEEL WORKS, LTD., Tokyo (JP)

(72) Inventors: Makoto Tojo, Hiroshima (JP); Yohei Shimizu, Hiroshima (JP); Daigo Saga, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 125 days.

(21) Appl. No.: 15/541,615

(22) PCT Filed: Jan. 13, 2016

(86) PCT No.: PCT/JP2016/050840
§ 371 (c)(1),
(2) Date: Jul. 5, 2017

(87) PCT Pub. No.: WO2016/114305
PCT Pub. Date: Jul. 21, 2016

(65) Prior Publication Data
US 2018/0001514 A1 Jan. 4, 2018

(30) Foreign Application Priority Data
Jan. 13, 2015 (JP) ................................ 2015-004429

(51) Int. Cl.
*B29B 7/84* (2006.01)
*B29B 7/42* (2006.01)
*B29B 7/48* (2006.01)
*B29B 7/82* (2006.01)
*B29C 48/76* (2019.01)
(Continued)

(52) U.S. Cl.
CPC .................. *B29B 7/84* (2013.01); *B29B 7/42* (2013.01); *B29B 7/48* (2013.01); *B29B 7/82* (2013.01)

(58) Field of Classification Search
CPC ... B29C 48/297; B29C 48/762; B29C 48/767; B29C 48/82; B29C 48/29; B29B 7/84
See application file for complete search history.

(56) References Cited

U.S. PATENT DOCUMENTS 3,917,507 A * 11/1975 Skidmore ............. B29C 48/362
159/2.2

FOREIGN PATENT DOCUMENTS

JP    2004-66705 A    3/2004
JP    2009-172493 A   8/2009
(Continued)

OTHER PUBLICATIONS

International Search Report dated Feb. 23, 2016 issued by the International Searching Authority in counterpart International Application PCT/JP2016/050840 (PCT/ISA/210).
(Continued)

*Primary Examiner* — Xiao S Zhao
*Assistant Examiner* — Michael Robinson
(74) *Attorney, Agent, or Firm* — Sughrue Mion, PLLC

(57) ABSTRACT

An extruder (1) includes a cylinder (2) and a screw (3), and one or more front vents (8a) are provided on the cylinder (2) upstream of a hopper (5) and downstream of a rear vent (7). The cylinder (2) is provided with, between the hopper (5) and the rear vent (7), a liquid supply device (9) for spraying water into the cylinder (2) to cool an interior thereof and a liquid discharge port (12) that is opened in a lower portion of the cylinder (2).

10 Claims, 1 Drawing Sheet

(51) Int. Cl.
*B29K 21/00* (2006.01)
*B29B 7/72* (2006.01)
*B29B 7/74* (2006.01)
*B29C 48/395* (2019.01)
*B29C 48/285* (2019.01)
*B29C 48/29* (2019.01)
*B29C 48/00* (2019.01)
*B29C 48/03* (2019.01)
*B29C 48/40* (2019.01)
*B29C 48/82* (2019.01)

(56) References Cited

FOREIGN PATENT DOCUMENTS

| JP | 2009172493 A | * | 8/2009 | ............ B01F 15/063 |
| JP | 2011-116025 A | | 6/2011 | |
| JP | 2011116025 A | * | 6/2011 | ........... B29C 48/575 |

OTHER PUBLICATIONS

Written Opinion dated Feb. 23, 2016 issued by the International Searching Authority in counterpart International Application PCT/JP2016/050840 (PCT/ISA/237).

* cited by examiner

[FIG.1]
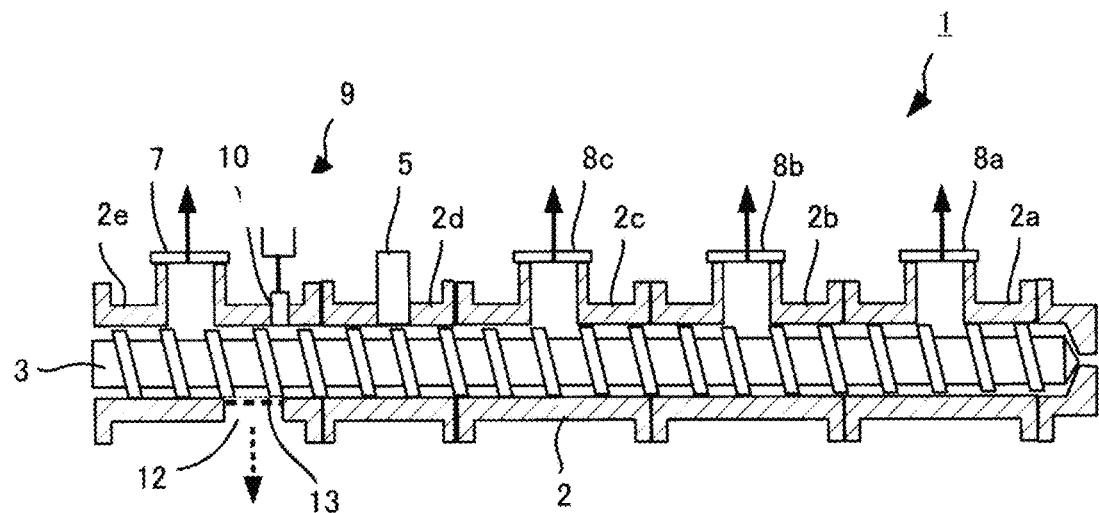
[FIG.2]
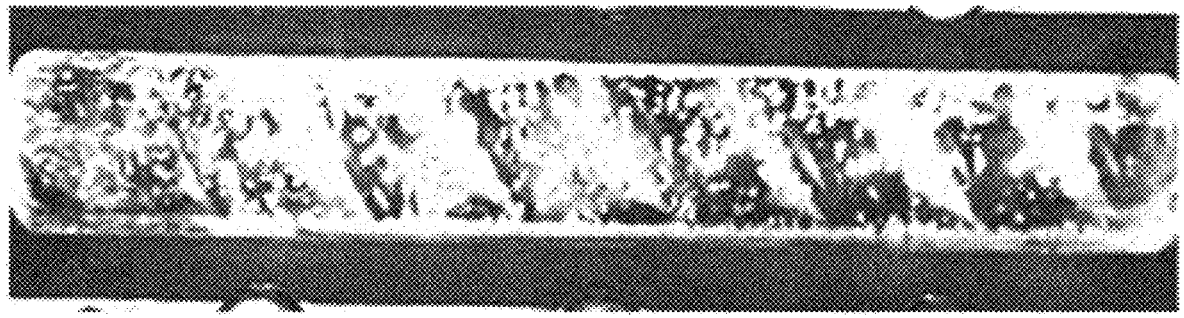
[FIG.3]
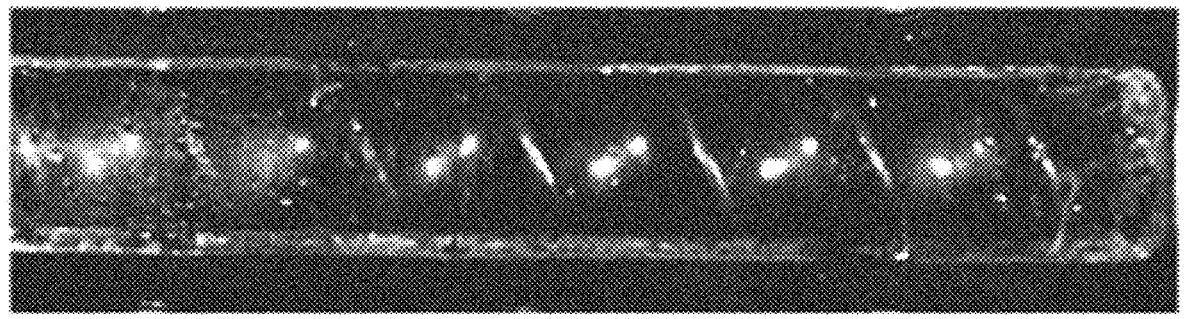

EXTRUDER PROVIDED WITH VENTS

TECHNICAL FIELD

The present invention relates to an extruder provided with a vent for devolatilizing a solvent resin solution which is a resin material containing a volatile substance and extruding the resulting devolatilized material to obtain a resin material.

BACKGROUND ART

Industrially used resin materials include various types of resin such as polycarbonate, polyethylene and ABS resins. In addition, materials obtained from monomers through polymerization reaction, that is, synthetic rubbers such as ethylene-propylene-diene rubber (EPDM), nitrile-butadiene rubber (NBR), stylene-butadiene rubber (SBR) and the like can be regarded as resin materials in a broad sense. In this description, the term reading "resin material" is used as including synthetic rubbers. Then, a monomer material is polymerized in a polymerization apparatus to obtain a so-called solvent resin solution. The resulting solvent resin solution is made up of a nonvolatile polymer and a volatile substance. Removing the volatile substance from the solvent resin solution produces a resin material. The removal of such a volatile substance, that is, devolatilization can be executed by an extruder. As well known, an extruder is made up of a cylinder and a screw which rotates in the cylinder, and a hopper is provided on the cylinder for feeding a solvent resin solution into the cylinder. In a volatilization extruder, a plurality of vents are provided on the cylinder to devolatilize volatile substances. Specifically, a rear vent is provided rearwards of a hopper, and one or two or more front vents are provided forwards of the hopper. A single screw extruder having a single screw or double screw extruder having two screws may be used for such a volatilization extruder. When a solvent resin solution is introduced into the extruder from the hopper to rotate the screws, the solvent resin solution is kneaded and pushed forwards. When the solvent resin solution is kneaded and pushed forwards, volatile substances volatilize from the solvent resin solution and are then discharged from the plurality of vents. Namely, the solvent resin solution is devolatilized. The resulting resin material from which the volatile substances are removed is extruded from a die at a front end of the extruder. The resin material so extruded is then cut as required by a cutter to thereby obtain pellets which constitute a material used in an injection molding machine.

When the solvent resin solution is extruded by the extruder provided with the vents, part of the volatile substances which have volatized is discharged from the rear vent. As this occurs, an entrainment phenomenon is produced in which the resin material is caused to flow in a splash or particulate form in a reverse direction within a predetermined range by means of the pressure of the volatile substances which have volatilized. As this occurs, splash matters or particulate matters, which are so-called entrained matters, are scattered around the rear bent. Many of these entrained matters are sent forwards by the screw to be kneaded together with the resin material inside the cylinder, causing no problem. However, part of the entrained matters accumulates inside the rear vent. Once those entrained matters accumulate in the rear vent, there is caused a problem that the devolatilization capability of the volatilization extruder is reduced. Additionally, there is also caused a problem that the accumulated entrained matters fall into the cylinder to contaminate the resin material in the cylinder.

To cope with these problems, it is necessary to prevent the accumulation of entrained matters in the rear vent. As one of countermeasures, there is a method in which a long distance is ensured between the hopper and the rear vent. In an extruder in which a long distance is ensured between a hopper and a rear vent, even though entrained matters are produced near the hopper, it becomes difficult for the entrained matters so produced to be scattered as far as the vicinity of the rear bent, thereby reducing the risk of those entrained matters accumulating in the rear vent. As a different countermeasure, the flow velocity of volatile substances which have volatilized is reduced by increasing the volumetric capacity of a portion of a cylinder between a hopper and a rear vent by increasing a bore diameter of the cylinder or increasing the flight channel of a screw at the portion of the cylinder. This is because a reduced flow velocity can reduce the momentum of entrained matters which attempt to flow in the reverse direction.

PTL 1 also proposes an extruder which prevents the accumulation of entrained matters in a rear vent. The extruder described in PTL 1 includes a cylinder which is made up of a plurality of cylinder blocks. A hopper, that is, a material feeding port is provided on a cylinder block which is provided with a rear vent. The material feeding port is opened to a lateral or lower side of a screw, so that a material solution, that is, a solvent resin solution is designed to be fed into the cylinder from the lateral or lower side of the screw. Volatile substances volatilize from the solvent resin solution inside the cylinder and flow upwards to be discharged to the outside from the rear vent which is upper side of the screw. When feeding the solvent resin solution into the cylinder, since the solvent resin solution is fed from the lateral or lower side of the screw into the cylinder, there is no such situation that the solvent resin solution being fed disrupts the discharge of the volatile substances which have volatilized. Namely, there is no such situation that the volatile substances which have volatilized prevent the devolatilization of the volatile substances. This can prevent the scattering of the resin material to thereby prevent the accumulation of entrained matters in the rear vent.

CITATION LIST

Patent Literature

PTL 1: JP-A-2011-116025

SUMMARY OF INVENTION

Technical Problem

As has been described above, the problem is caused that the entrained matters accumulate in the rear vent which is provided rearwards of the hopper when the solvent resin solution containing the volatile substances is devolatilized by the extruder provided with the plurality of vents. The conventional extruder in which the long distance is ensured between the hopper and the rear vent, the conventional extruder in which the volumetric capacity of the portion of the cylinder which lies between the hopper and the rear vent is increased, and the extruder described in PTL 1 are superior in preventing the accumulation of entrained matters in the rear vent to some extent. However, they seem to have problems. Firstly, in the case of the conventional extruder in which the long distance is ensured between the hopper and the rear vent, there is a problem that the overall length of the extruder becomes long, which enlarges the size of the extruder. Additionally, even with this conventional extruder, there is still a problem that the accumulation of entrained matters in the rear vent cannot be prevented completely. Although the volatile substances which are volatilized near the hopper are discharged to the outside from the rear vent, the pressure thereof is not released until the volatile substances reach the rear vent. Then, even with the long distance ensured between the hopper and the rear vent, the pressure under which the resin material is caused to flow in the reverse direction is not reduced, and therefore, part of entrained matters is conveyed as far as the vicinity of the rear vent. Namely, the accumulation of the entrained matters so conveyed can be prevented to some extent but cannot be prevented completely. With the conventional extruder in which the volumetric capacity of the portion of the cylinder which is situated between the hopper and the rear bent is increased, there is still a problem. The fabrication cost of the extruder becomes great, and it is difficult to secure such a sufficient volumetric capacity as to reduce the flow velocity of the volatile substances which have volatilized. In the extruder described in PTL 1, the volatile substances which volatilized from the solvent resin solution flows upwards without being disrupted by the solvent resin solution which is fed into the cylinder through the material feeding port. By doing so, the volatile substances are discharged smoothly from the rear vent, thereby making it possible to prevent the generation of entrained matters to some extent. Thus, the possibility is small that entrained matters accumulate in the rear vent. However, part of the volatile substances which volatilize from the solvent resin solution is confined in the solvent resin solution. The pressure of the gas so confined produces entrained matters. Namely, even with the extruder described in PTL 1, the accumulation of entrained matters in the rear vent cannot be prevented completely.

An object of the invention is to provide an extruder which can solve the problems described above. Particularly, an object of the invention is to provide an extruder provided with a plurality of vents for devolatilizing a solvent resin solution which is a resin material containing volatile substances and extruding the solvent resin solution to obtain a resin material which can prevent the accumulation of entrained matters in a rear vent substantially completely while being kept compact in size without an overall length of the extruder being increased.

Solution to Problem

With a view to achieving the object described above, according to the invention, there is provided an extruder including a cylinder and one or two screws which rotate in the cylinder and in which one or more vents are provided on the cylinder. In this extruder, when a solvent resin solution, which is a resin material containing volatile substances, is fed from a hopper to be pushed forwards by the screws, the volatile substances volatilize to be discharged to the outside from the vents. In this extruder of the invention, a liquid supply device is provided on a portion of the cylinder which is situated between the hopper and a rear vent to supply a cooling liquid into the portion of the cylinder, and a liquid discharge port is provided so as to be opened in a lower portion of the cylinder. In a preferred form, the cooling liquid is water, and the liquid supply device is a water spraying device for spraying water into the cylinder.

The object of the invention is achieved by the following configurations:

(1) An extruder comprising a cylinder and one or two screws which rotate in the cylinder, wherein the cylinder is provided with one or more vents, and wherein the extruder is configured such that when a solvent resin solution, which is a resin material containing a volatile substance, is fed from a hopper and the solvent resin solution is sent downstream in the cylinder by the screws, the volatile substance volatilizes so as to be discharged from the vents, wherein the cylinder is provided with, on an upstream of the hopper, a liquid supply device for supplying a cooling liquid into the cylinder, and a liquid discharge port that is opened in a lower portion of the cylinder.

(2) The extruder according to the above (1), wherein the vents comprise a rear vent which is provided upstream of the hopper and one or more front vents which are provided downstream of the hopper, and the liquid supply device and the liquid discharge port are provided between the hopper and the rear vent.

(3) The extruder according to the above (1) or (2), wherein the cooling liquid is water, and the liquid supply device is a water spraying device for spraying water.

(4) The extruder according to the above (1), wherein a screen member is provided in the liquid discharge port.

Advantageous Effects of Invention

According to the aspect of the invention described under (1) above, the liquid supply device for supplying the cooling liquid into the cylinder is provided and the liquid discharge port which is opened in the lower portion of the cylinder is provided on the upstream of the hopper on the cylinder. Then, part of the volatile substance which volatilizes is condensed into liquid by the cooling liquid supplied from the liquid supply device into the cylinder upstream of the hopper, whereby the pressure of the volatile substance is reduced quickly and drastically. This rapidly reduces the momentum of entrained matters which flow in a reverse direction.

In addition, according to the aspect of the invention described under (I) above, the liquid discharge port which is opened in the lower portion of the cylinder is provided upstream of the hopper. This ensures that the volatile substance which is condensed into liquid is discharged from the liquid discharge port and hence, there is no such situation that the liquefied volatile substance is pushed forwards to be kneaded together with the resin material.

According to the aspect of the invention described under (2) above, since the rear vent is provided upstream of the hopper, entrained matters cannot reach the vicinity of the rear vent. Namely, the accumulation of entrained matters in the rear vent can be prevented substantially completely. In this case, a long distance does not have to be ensured between the hopper and the rear vent, and the overall length of the extruder can be shortened.

According to the aspect of the invention described under (3) above, the cooling liquid is water, and the liquid supply device is the water spraying device for spraying water. Namely, since water is used as the cooling liquid, the cost is inexpensive. Additionally, the volatile substance that has volatilized can be cooled by water sprayed from the water spraying device so as to be condensed efficiently and in a short period of time, whereby the condensed volatile substance can be discharged together with the water from the liquid discharge port.

According to the aspect of the invention described under (4) above, the screen member is provided in the liquid discharge port. According to the aspect of the invention described under (1) above, the momentum by which entrained matters would otherwise be caused to flow in the reverse direction is advantageously reduced by the liquid supply device, whereby there is produced substantially no entrained matter which is scattered to the vicinity of the rear vent. However, there are some entrained matters which are scattered to the vicinity of the liquid discharge port. According to the aspect of the invention described under (4) above, since the screen member is provided, the resulting entrained matters are pushed forwards in an ensured fashion by the screws without being discharged from the liquid discharge port, whereby it is ensured that the entrained matters which are so pushed forwards are kneaded together with the resulting resin material. Namely, there is provided an advantageous effect that the resin material is not wasted.

BRIEF DESCRIPTION OF DRAWINGS

FIG. 1 is a front sectional view of an extruder according to an embodiment of the invention.

FIG. 2 is a photograph showing an interior of a cylinder 2 of the extruder according to the embodiment of the invention which results when the extruder is operated with a water spraying device kept stopped.

FIG. 3 is a photograph showing the interior of the cylinder of the extruder according to the embodiment of the invention which results when the extruder is operated with water kept sprayed from the water spraying device.

DESCRIPTION OF EMBODIMENTS

Hereinafter, an embodiment of the invention will be described. As shown in FIG. 1, an extruder 1 according to the embodiment includes a cylinder 2 and a screw 3 which is provided inside the cylinder 2. One or two screws may be provided as the screw 3, and the invention can be carried out with one or two screws. Although only one screw 3 is shown in FIG. 1, the extruder 1 according to this embodiment is a double screw extruder which includes two screws 3. Then, the two screws 3 are accommodated in the cylinder 2 in such a way that the two screws 3 mesh with each other and are designed to rotate in synchronism with each other by a predetermined drive mechanism, which is not shown in the figure. As with a conventional cylinder, the cylinder 2 is made up of a plurality of cylinder blocks 2a, 2b, . . . , and these cylinder blocks 2a, 2b, . . . are joined together. Assuming that a direction in which a material is extruded is front, a hopper 5 is provided on a cylinder block 2d which is situated relatively rearwards in the cylinder 2, and a material is introduced into the cylinder 2 from this hopper 5. A rear vent 7 is provided on a cylinder block 2e which is situated at the rear of the cylinder block 2d on which the hopper 5 is provided. Additionally, a first to third front vents 8a, 8b, 8c are provided on cylinder blocks 2a, 2b, 2c which are provided relatively forwards in the cylinder 2. Namely, in consideration of the direction in which the material is extruded, in the cylinder 2, the rear vent 7 is provided upstream of the hopper 5, and the front vents 8a, 8b, 8c are provided downstream of the hopper 5. Although not shown in FIG. 1, a vacuum source is connected to the rear vent 7 and the front vents 8a, 8b, 8c so that gases which volatilize from a material in the cylinder 2 are sucked out therethrough. In addition, devices for heating and cooling the cylinder 2 with steam or oil are provided on the cylinder 2, so that the cylinder 2 is controlled to be heated or cooled to required temperatures in predetermined positions. A die is provided at the front of the cylinder 2, so that a resin material pushed forwards by the screws 3 is extruded from the die.

The extruder 1 according to the embodiment has two characteristics. A first characteristic is that a liquid supply device 9 is provided on the cylinder 2 between the hopper 5 and the rear vent 7 to supply a cooling liquid into the cylinder 2. In this embodiment, the cooling liquid is water, and the liquid supply device 9 is a water spraying device. The water spraying device 9 includes a nozzle 10, and the nozzle 10 is provided on the cylinder 2. Specifically, the nozzle 10 is provided downstream of the rear vent 7 on the cylinder block 2e on which the rear vent 7 is provided. Water is sprayed into the cylinder 2 from the nozzle 10.

A second characteristic of the extruder 1 according to the embodiment is that a discharge port (a liquid discharge port) 12 is provided on the cylinder 2 between the hopper 5 and the rear vent 7. The discharge port 12 is provided on the cylinder block 2e on which the rear vent 7 is provided. The discharge port 12 is opened in a lower portion of the cylinder, and a predetermined screen member 13 is provided in the discharge port 12. This screen member 13 captures particulate solid matters so that only liquid is discharged to the outside of the cylinder 2. The solid matters captured by the screen member 13 are pushed forwards by the screws 3. Although not shown in FIG. 1, a predetermined pipe line is connected to the discharge port 12 so that discharged liquid is sent to an exterior portion.

The function of the extruder 1 according to the embodiment will be described. The extruder 1 according to the embodiment is designed to treat a solvent resin solution which is obtained by a so-called polymerizing apparatus. A known apparatus can be used for the polymerizing apparatus, and hence, the polymerizing apparatus will not be described here. In the polymerizing apparatus, a monomer material is introduced thereinto for polymerization reaction through a slurry method, an emulsifying method, a solution method or the like to thereby obtain a polymer which is a resin material. This resin material is obtained as a solvent resin solution which also contains volatile substances. The solvent resin solution is treated with the extruder 1 according to the embodiment.

In the extruder 1, the temperature of the cylinder 2 is controlled by the heating device and the cooling device which are not shown in FIG. 1, and the screws 3 are rotated. The water spraying device 9 is driven to spray water through nozzle 10. In this state, the solvent resin solution is fed continuously from the hopper 5 into the cylinder 2. Alternatively, water is started to be sprayed from the water spraying device 9 at the same time as the solvent resin solution is started to be fed into the cylinder 2 from the hopper 5. The solvent resin solution fed from the hopper 5 is pushed downstream or forwards in the cylinder 2 while being kneaded by the screws 3, and volatile substances in the solvent resin solution volatilize inside the cylinder 2 in the process of the solvent resin solution being pushed forwards. The volatile substances volatilize easily inside the cylinder 2 which is controlled to be heated or cooled to a predetermined temperature. Most of the volatile substances which have volatilized flow upstream in a reverse direction inside the cylinder 2, and the remaining of the volatile substances which have volatilized is sent forwards to be discharged to the outside from the first to third front vents 8a, 8b, 8c. When the volatile substances which have volatilized or the volatile gases flow in the reverse direction, the resulting resin material is torn by the pressure of the volatile gases, and the torn resin materials are scattered in the upstream direction. Namely, entrained matters are produced. In the extruder 1 according to the embodiment, when the gaseous volatile substances come into contact with water which is sprayed from the nozzle 10, part of the gaseous volatile substances is condensed quickly into liquid. This reduces the pressure of the gaseous volatile substances flowing in the upstream direction. Consequently, no entrained matter is produced upstream of the water spraying device 9. A mixture of the volatile substances which are condensed into liquid and the sprayed water is discharged to the outside from the discharge port 12. The volatile substances which remain in the form of gas without being condensed is discharged to the outside from the rear vent 7. The volatile substances volatilize as the solvent resin solution is pushed forwards by the screws 3, and the volatile substances which have so volatilized are discharged to the outside from the first to third front vents 8a, 8b, 8c to thereby obtain a resin material. The resulting resin material is extruded from the extruder 1. Entrained matters produced between the hopper 5 and the rear vent 7 are pushed forwards by the screws 3 to be kneaded together with the resin material which is being pushed forwards by the screws 3.

Example 1

Experiments were carried out to confirm that no entrained matter is accumulated in the rear vent 7 when treating the solvent resin solution by the extruder 1 according to the embodiment.

Experiment Conditions: Ethylene-propylene-diene rubber (EPDM) containing 20% normal hexane was used as a solvent resin solution. The rear vent 7 was opened to the atmospheric pressure. The extruder 1 according to the embodiment utilized a so-called see-through cylinder 2 part of which was made up of a transparent material so as to enable an interior of the cylinder 2 to be seen from the outside.

Experiment 1: In the extruder 1 according to the embodiment, the solvent resin solution was treated with the water spraying device 9 kept stopped. Namely, the solvent resin solution was treated by stopping the spray of water from the nozzle 10. The extruder 1 was operated for 10 minutes, and a check was made to find out an amount of entrained matters adhering to the screws 3. A large amount of entrained matters adhered to the screws 3 not only at portions corresponding to the vicinity of the nozzle 10 but also at portions corresponding to the vicinity of the rear vent 7. As shown in a photograph in FIG. 2, a large amount of entrained matters are seen adhering to the screw 3.

Experiment 2: The screws 3 were cleaned up, and the solvent resin solution was treated in the extruder 1 according to the embodiment with the water spraying device 9 activated to operate. Namely, the solvent resin solution was treated by spraying water from the nozzle 10. The extruder 1 was operated for 10 minutes, and a check was made to find out an amount of entrained matters adhering to the screws 3. There was no entrained matter adhering to the portions of the screws 3 corresponding to the rear vent 7. A slight amount of entrained matters were found to adhere to the portions of the screws 3 corresponding to the vicinity of the nozzle 10. As shown in a photograph in FIG. 3, it is seen that almost no entrained matter adheres to the screw 3.

Consideration: It has been confirmed that almost no entrained matter was generated in the vicinity of the rear vent 7 by spraying water into the cylinder 2 by the water spraying device 9. It can be said from this face that there is almost no possibility that entrained matters accumulate in the rear vent 7. In either of Experiments 1, 2, the ethylene-propylene-diene rubber which was extruded from the extruder 1 was checked to confirm that the concentration of normal hexane was not more than 1000 ppm and that both Experiments 1, 2 had the equal capabilities in relation to devolatilization of the solvent resin solution.

The invention is not limited to the embodiment which has been described heretofore but can be modified or improved as required. In addition, the materials, shapes, dimensions, numeric values, modes, numbers, locations and the like of the constituent elements of the embodiment that has been described heretofore are arbitrary and are not limited to those described herein, provided that the invention can be attained.

For example, in this embodiment, although it has been described that the cooling liquid is water and that the liquid supply device 9 is the water spraying device 9, the cooling liquid may be other liquids such as alcohol or the like. This because the object of the invention can be achieved, provided that the volatile substance such as normal hexane can be condensed. Additionally, in this embodiment, although it is described that the screen member 13 is provided in the discharge port 12, the screen member 13 is not essential. In particular, in the case of a resin material having a relatively high viscosity being treated, in case the screen member 13 is provided, the resin material adheres to the screen member 13 to clog it, leading to a problem that the extruder 1 cannot be operated continuously. To avoid such a risk, the screen member 13 does not have to be provided in the discharge port 12, so that the solid resin materials which are caused to flow in the reverse direction to the vicinity of the discharge port 12 may be discharged to the outside from the discharge port 12. There are other modifications. Although it is described that the vents include the rear vent 7 and the three front vents 8a, 8b, 8c, the front vents are not limited to the three front vents 8a. 8b, 8c, and hence, two or four or more front vents may be provided. Further, the rear vent 7 is not essential, either. In the event that the volatile substances can be condensed sufficiently by the water spraying device 9, almost all the volatile substances which flow in the reverse direction inside the cylinder 2 are condensed into liquid, and therefore, the resulting liquid should be discharged from the discharge port 12. Thus, there is no particular reason that the rear vent 7 is provided.

Although the invention has been described in detail and by reference to the specific embodiment, it is obvious to those skilled in the art to which the invention pertains that various alterations and modifications can be made thereto without departing from the spirit and scope of the invention.

This patent application is based on Japanese Patent Application (No. 2015-4429) filed on Jan. 13, 2015, the contents of which are incorporated herein by reference.

Here, the characteristics of the embodiment of the extruder according to the invention that has been described heretofore are briefly summarized altogether under [1] to [4] below.

[1] The extruder (1) including the cylinder (2) and the one or two screws (3) which rotate in the cylinder (2), wherein the cylinder (2) is provided with one or more vents (7, 8a, 8b, 8c), and wherein the extruder (1) is configured such that when the solvent resin solution, which is the resin material containing the volatile substance, is fed from the hopper (5) and the solvent resin solution is sent downstream in the cylinder (2) by the screws (3), the volatile substance volatilizes so as to be discharged from the vents (7, 8a, 8b, 8c), wherein the cylinder (2) is provided with on the upstream of the hopper (5), the liquid supply device (9) for supplying the cooling liquid into the cylinder (2) and the liquid discharge port (12) that is opened in the lower portion of the cylinder (2).

[2] The extruder (1) according to [1], wherein the vents includes the rear vent (7) which is provided upstream of the hopper (5) and the one or more front vents (8a, 8b, 8c) which are provided downstream of the hopper (5), and the liquid supply device (9) and the liquid discharge port (12) are provided between the hopper (5) and the rear vent (7).

[3] The extruder (1) according to [1] or [2], wherein the cooling liquid is water, and the liquid supply device (9) is the water spraying device (the nozzle 10) for spraying water.

[4] The extruder (1) according to any one of [1] to [3], wherein
the screen member (13) is provided in the liquid discharge port (12).

INDUSTRIAL APPLICABILITY

According to the invention, the extruder can be provided which can prevent substantially completely the accumulation of entrained matters in the rear vent while preventing the increase in overall length of the extruder so as to keep the extruder compact in size. The invention which can provide this advantageous effect is useful in the field of extruders.

REFERENCE SIGNS LIST 1 extruder
2 cylinder
3 screw
5 hopper
7 rear vent
8a, 8b, 8c first to third front vents
9 liquid supply device
10 nozzle
12 discharge port (liquid discharge port)
13 screen member
15 refrigerant pipe

The invention claimed is:

1. An extruder comprising: a cylinder; and one or more screws which rotate in the cylinder, wherein the cylinder is provided with one or more vents, wherein the extruder is configured such that when a solvent resin solution, which is a resin material containing a volatile substance, is fed from a hopper and the solvent resin solution is sent downstream in the cylinder by the screws, the volatile substance volatilizes so as to be discharged from the one or more vents, and wherein the cylinder is provided with, at a position upstream of the hopper, a liquid supply port for supplying a cooling liquid from a liquid supply device into the cylinder, and a liquid discharge port in a lower portion of the cylinder.

2. The extruder according to claim 1, wherein the one or more vents comprise a rear vent which is provided upstream of the hopper and one or more front vents which are provided downstream of the hopper, and wherein the liquid supply port and the liquid discharge port are provided between the hopper and the rear vent.

3. The extruder according to claim 1, wherein the cooling liquid is water, and wherein the liquid supply device is a water spraying device for spraying water.

4. The extruder according to claim 1, wherein a screen member is provided in the liquid discharge port.

5. The extruder according to claim 1, wherein the hopper is provided in an upper portion of the cylinder.

6. The extruder according to claim 1, wherein the one or more vents comprise a rear vent which is provided upstream of the hopper and one or more front vents which are provided downstream of the hopper, and wherein the cylinder comprises a plurality of cylinder blocks comprising: a first cylinder block comprising the rear vent; a second cylinder block comprising the hopper, the second cylinder block being provided downstream of the first cylinder block; and a third cylinder block comprising the front vent, the third cylinder block being provided downstream of the second cylinder block.

7. The extruder according to claim 1, wherein the hopper is provided at a position downstream of the liquid discharge port.

8. The extruder according to claim 1, wherein the one or more vents comprise: a rear vent provided upstream of the hopper; and one or more front vents provided downstream of the hopper, and wherein the liquid discharge port is provided at a position downstream of the rear vent.

9. An extruder comprising: a cylinder; and one or more screws which rotate in the cylinder, wherein the cylinder comprises: a first cylinder block comprising a liquid discharge port and a liquid supply port; a second cylinder block comprising a hopper at a position downstream of the first cylinder block; and a third cylinder block comprising a front vent at a position downstream of the second cylinder block, wherein the liquid discharge port is provided in a lower portion of the cylinder, wherein the liquid supply port is for supplying a cooling liquid into the cylinder, wherein the hopper is configured to receive a solvent resin solution which is a resin material containing a volatile substance, and wherein the screws are configured to send the solvent resin solution downstream in the cylinder to volatize the volatile substance so as to discharge the volatile substance from the front vent.

10. The cylinder according to claim 9, wherein the first cylinder block further comprises a rear vent.

* * * * *